(12) United States Patent
Serpe et al.

(10) Patent No.: US 12,012,643 B2
(45) Date of Patent: Jun. 18, 2024

(54) METHOD FOR THE RECOVERY OF PALLADIUM

(71) Applicant: UNIVERSITA' DEGLI STUDI DI CAGLIAR, Cagliari (IT)

(72) Inventors: Angela Serpe, Cagliari (IT); Eros Perra, Cagliari (IT); Americo Rigoldi, Cagliari (IT)

(73) Assignee: UNIVERSITA' DEGLI STUDI DI CAGLIAR, Cagliari (IT)

( * ) Notice: Subject to any disclaimer, the term of this patent is extended or adjusted under 35 U.S.C. 154(b) by 596 days.

(21) Appl. No.: 17/281,740

(22) PCT Filed: Oct. 2, 2019

(86) PCT No.: PCT/IB2019/058368
§ 371 (c)(1),
(2) Date: Mar. 31, 2021

(87) PCT Pub. No.: WO2020/070654
PCT Pub. Date: Apr. 9, 2020

(65) Prior Publication Data
US 2021/0395858 A1      Dec. 23, 2021

(30) Foreign Application Priority Data
Oct. 2, 2018   (IT) .................. 102018000009093

(51) Int. Cl.
C22B 11/00     (2006.01)
C22B 3/26      (2006.01)

(52) U.S. Cl.
CPC ............ C22B 11/042 (2013.01); C22B 3/302 (2021.05)

(58) Field of Classification Search
CPC ............................ C22B 11/042; C22B 3/302
See application file for complete search history.

(56) References Cited

U.S. PATENT DOCUMENTS

| 2008/0264799 A1* | 10/2008 | Seelmann-Eggebert ................... C25B 1/00 205/351 |
| 2018/0135148 A1* | 5/2018 | Dixon ................... C22B 23/043 |
| 2021/0395858 A1* | 12/2021 | Serpe ...................... C22B 3/302 |

OTHER PUBLICATIONS

Suoranta et al., "ecovery of palladium, platinum, rhodium and ruthenium catalyst materials using microwave-assisted leaching and cloud point extraction" Hydrometallurgy, 2015, v 154, p. 56-62.
Ishii et al., "Extractive spectrophotometric determination of micro amounts of palladium with N, N'- diphenylpropanedithioamide (DPDTA) and equilibria and kinetics of extraction of palladium with DPDTA" Analytical Sciences, 1991, v 7, p. 73-79.
Pellacani et al., "Palladium (II) complexes with dithiomalonamide and N, N'-diphenyldithiomalonamide" Can. J. Chem., 1974, v 52, p. 3454-3458.

* cited by examiner

Primary Examiner — Keith D. Hendricks
Assistant Examiner — Moriah S. Smoot
(74) Attorney, Agent, or Firm — Gregory P. Einhorn; Greer, Burns & Crain, Ltd.

(57) ABSTRACT

The present invention relates to a method for the recovery of palladium from an aqueous solution, comprising the steps of: (A) providing a dispersion comprising an aqueous dispersing phase comprising palladium(II), at least one non-ionic surfactant and at least one compound bearing a beta-dithiocarbonyl group, so as to form a hydrophobic complex of palladium(II) with the compound bearing a beta-dithiocarbonyl group; (B) heating the dispersion resulting from step (A) to a temperature at least equal to its cloud point so as to obtain the phase separation between the aqueous dispersing phase and a dispersed phase rich in surfactant comprising at least a part of said hydrophobic complex; (C) separating the dispersed phase rich in surfactant from the aqueous dispersing phase resulting from step (B); and (D) recovering the hydrophobic complex of palladium(II) with the compound bearing a beta-dithiocarbonyl group.

20 Claims, No Drawings

METHOD FOR THE RECOVERY OF PALLADIUM

This application is a national phase application claiming benefit of priority under 35 U.S.C. § 371 to Patent Convention Treaty (PCT) International Application serial number PCT/IB2019/058368, filed Oct. 2, 2019, now pending, which claims the benefit of priority to Italian patent No. 102018000009093 filed on Oct. 2, 2018. The aforementioned applications are expressly incorporated herein by reference in their entirety and for all purposes.

FIELD OF THE INVENTION

The present invention relates to a method for the recovery of palladium. More particularly, the present invention relates to a method for the quantitative recovery of palladium(II) from aqueous solutions by cloud point extraction (CPE) where a compound bearing a beta-dithiocarbonyl group is used to form a hydrophobic complex of palladium which is extracted from the aqueous solution by the use of a suitable non-ionic surfactant.

STATE OF THE ART

Palladium is a rare and precious metal that finds application in a large number of areas, including the production of catalysts, electronics, jewelry, chemistry and medicine. Among the various uses, the most important in terms of quantity is the manufacture of catalysts used in the automotive sector for the conversion of exhaust gases.

Given its rarity and its high value, exhausted palladium-based catalysts, both those used in the automotive sector and those used in the chemical industry, electronic waste containing said metal and wastewater from industrial processes or natural waters containing said metal are all considered an important source of palladium supply, through its recovery.

Current methods for the recovery of palladium from solid materials can be divided into two categories: pyrometallurgical and hydrometallurgical methods, which are more widespread from an industrial point of view.

The pyrometallurgical methods are based on the use of high temperatures in the various processes and, although they allow metals to be recovered efficiently, they are highly energy consuming. In general, to obtain a high selectivity, they may require subsequent hydrometallurgical and electrochemical treatments to refine the products.

The hydrometallurgical methods, less energy-consuming and more tuneable, on the other hand, are based on the sequence of some steps, in particular a non-selective (or only partially selective) acidic or caustic leaching of the solid materials, followed by purification and separation of the desired products, by means of precipitation or extraction with a solvent.

Wastewater containing palladium is often the result of non-selective leaching processes and, as such, it must undergo the purification and separation processes mentioned above.

Solvent extraction has been for a long time one of the most widespread methods in the literature for the selective recovery of metals and more widely applied industrially to waste and leaching water for metals of the platinum group (PGM), as described for example in J. Barnes, et al., "Solvent extraction at Inco's Acton precious metal refinery", Chemistry and Industry (London) 1982, 151-155, or HAJIME ISHII ET AL: "Extractive spectrophotometric determination of microamounts of palladium with N,N'-diphenylpropane-d ithioamide (DPDTA) and equilibria and kinetics of extraction of palladium with DPDTA.", ANALYTICAL SCIENCES, vol. 7, no. 1, 31 Mar. 1991 (1991-03-31), pages 73-79, XP055591133, JP ISSN: 0910-6340, DOI: 10.2116/analsci.7.73.

In addition to this, extraction processes that use surfactants have also been used. For example, the process known as "liquid surfactant membrane" has been used successfully to extract palladium from wastewater that also contains large amounts of iron, as described for example in T. Kakoi, et al., "Selective recovery of palladium from a simulated industrial wastewater by liquid surfactant membrane process", Journal of membrane science 1996, 118, 63-71.

Also, the selective absorption of metal complexes on solid or solid-state supported materials is widely used as an alternative to liquid-liquid extraction, often by means of ion-exchange resins or activated carbon.

A recent example of recovery of PGMs from catalysts that combines an acid leaching step with an extractive technique is described in Suoranta T. et al "Recovery of palladium, platinum, rhodium and ruthenium from catalyst materials using microwave-assisted leaching and cloud point extraction", Hydrometallurgy, 154 (2015) 56-62, where the recovery of palladium, platinum, rhodium and ruthenium from an automotive catalyst and from a ruthenium catalyst supported on alumina is studied, using a microwave-assisted leaching method combined with CPE.

SUMMARY OF THE INVENTION

The Applicant has observed that the state-of-the-art solutions that aim to recover palladium in an efficient and selective manner may exhibit some technological, functional and environmental limits.

In particular, the conventional hydrometallurgical methods of recovery of PGM from complex multi-metallic matrices are often based on the use of non-selective leaching agents showing low environmental sustainability, such as strong acids and oxidants (for example aqua regia) or cyanides in an alkaline environment. For this reason, one of the main leaching products (including wastewater) containing PGMs is multi-metallic aqueous solutions from which the metals of interest have to be extracted selectively.

Among the various selective extraction methods, those involving a solvent extraction have the disadvantage of requiring the use of high quantities of volatile organic solvents (VOC), to the detriment of their economic and environmental sustainability. This type of processes, which typically involves one or more operations selected among extraction (for example, for the transfer of the metal into an organic phase, typically with the aid of a complexing agent); washing (for example, for the removal of co-extracted metal ions); stripping (for example, for the transfer of the metal in a further aqueous solution) and purification of the organic solvent (for example, using an aqueous phase), often occurs by repeated (for example, by mixer-settler) or prolonged extractions (for example, by continuous extraction in counter-current) and may require large amounts of a hydrophobic liquid phase (VOC) capable of dissolving the metal complex obtained from the reaction, diluents and stripping solutions. Furthermore, the sustainability of this type of process is closely related to the cost and toxicity of the extractants and solvents used and to its effectiveness influenced by the selectivity and rapidity of the complex formation, as well as by the partition coefficient between the two phases.

The use of solid adsorbents, on the other hand, generally makes it possible to limit the use of large volumes of solvents and the production of wastewater. On the other hand, such adsorbents have relatively low metal extraction capacities and therefore considerable quantities of material are required to have a high extraction yield. Furthermore, these materials are often not completely selective, particularly when leaching solutions contain different metals. To increase selectivity, an adequate functionalization of the surface may be required. The desorption/recovery of the metal from the adsorbent also requires a further treatment step which is not always easy to carry out.

The Applicant has therefore faced the problem of identifying a novel and simple method for the recovery of palladium, capable of reducing and/or solving the aforementioned drawbacks.

More specifically, the Applicant has faced the problem of identifying a method for the recovery of palladium characterized by a high yield and simple implementation.

In accordance with the present invention, the Applicant has surprisingly found that these desired features can be achieved by forming a palladium complex with a compound bearing a beta-dithiocarbonyl group in a dispersion with an aqueous dispersing phase and comprising a non-ionic surfactant and which undergoes, when brought above a given temperature, represented by the cloud point of said dispersion, the phase separation between the aqueous dispersing phase and the dispersed phase rich in surfactant, from which it is subsequently possible to easily recover the palladium in the form of said complex.

Therefore, in a first aspect, the present invention relates to a method for the recovery of palladium, comprising the steps of:

(A) providing a dispersion comprising an aqueous dispersing phase comprising palladium(II), at least one non-ionic surfactant and at least one compound bearing a beta-dithiocarbonyl group, so as to form a hydrophobic complex of palladium(II) with the compound bearing a beta-dithiocarbonyl group;

(B) heating the dispersion resulting from step (A) to a temperature at least equal to its cloud point so as to obtain the phase separation between the aqueous dispersing phase and a dispersed phase rich in surfactant comprising at least a part of said hydrophobic complex;

(C) separating the dispersed phase rich in surfactant from the aqueous dispersing phase resulting from step (B); and (D) recovering the hydrophobic complex of palladium(II) with the compound bearing a beta-dithiocarbonyl group.

Within the scope of the present description and in the subsequent claims, the term "dispersion" means a system comprising a continuous phase, called "dispersing" phase, and one or more discontinuous phases, called "dispersed". An example of dispersion is an emulsion.

Within the scope of the present description and in the subsequent claims, the expression "hydrophobic complex" means a complex which, due to its structure, shows an affinity for apolar compounds greater than for water.

In step (A) of the method according to the present invention, a dispersion is initially prepared comprising an aqueous dispersing phase comprising palladium(II), at least one non-ionic surfactant and at least one compound bearing a beta-dithiocarbonyl group. Said compound complexes the palladium(II) present in the dispersion, forming a hydrophobic complex.

Without thereby wishing to be bound to a specific theory, the Applicant deems that said hydrophobic complex of palladium(II) with the compound bearing a beta-dithiocarbonyl group is a square planar complex of $[ML_2]^{n+}$ type (with n=2 if L is neutral, with n=0 if L is deprotonated and charged −1), and/or of $MLX_2$ type, where L represents the compound bearing a beta-dithiocarbonyl group, X a halide possibly present in the leaching solution and M the palladium(II). Palladium complexes of this type are known and, for example, described in Pellacani G. C. "Palladium(II) Complexes with Dithiomalonamide and N,N'-Diphenyldithiomalonamide" Can. J. Chem. vol. 52, 1974, 3454-3458.

Within the scope of the present invention, the formation of the hydrophobic complex of palladium(II) with the compound bearing a beta-dithiocarbonyl group in step (A) can be determined according to any of the methods known to the person skilled in the art, for example spectrophotometrically or by dissolving a dispersed phase sample in acetone, by crystallizing the hydrophobic complex of palladium(II) with the compound bearing a beta-dithiocarbonyl group, by diffusion of diethyl ether and subsequent characterization by cross-techniques (e.g. IR spectroscopy, CHN—S elemental analysis, X-ray diffraction, etc.).

Subsequently, the dispersion comprising said complex is heated to a temperature at least equal to its cloud point, with the consequent separation of the dispersed phase rich in surfactant from the aqueous dispersing phase.

The achievement of the cloud point can be known a priori based on the surfactant and the composition features of the dispersion or can be identified by direct observation of the dispersion during heating. The phase separation actually involves apparent cloudiness that can often be appreciated visually or for example can be determined by the usual laboratory techniques known for this purpose to the person skilled in the art, such as the multiple light scattering measurement.

The hydrophobic complex of palladium(II) with the compound bearing a beta-dithiocarbonyl group is partitioned between the dispersed phase rich in surfactant and the aqueous dispersing phase, and consequently, the hydrophobic complex that is found in the phase rich in surfactant is concentrated and can be easily recovered from it.

In the method according to the present invention, the dispersed phase rich in surfactant comprising at least a part of the hydrophobic complex of palladium(II) with the compound bearing a beta-dithiocarbonyl group is then separated from the remaining dispersion and subsequently the palladium is recovered from said phase rich in surfactant in the form of said complex.

Actually, the Applicant has found that by means of a method so configured it is advantageously possible to recover the palladium contained in aqueous solutions, such as for example wastewater from industrial processes or natural waters containing said metal as well as from solid starting materials, such as exhausted palladium-based catalysts used both in the automotive sector and in the chemical industry sector, and electronic waste containing said metal, after its solubilization.

DETAILED DESCRIPTION OF EMBODIMENTS OF THE INVENTION PRESENTLY PREFERRED

The present invention may have, in one or more of its aspects, one or more of the preferred features set forth below, which can be combined as desired with each other according to application requirements.

Within the scope of the present description and in the subsequent claims, all the numerical magnitudes indicating quantities, parameters, percentages, and so on are to be understood as preceded in all circumstances by the term "approximately", unless otherwise indicated. Furthermore, all the numerical magnitude ranges include all the possible combinations of the maximum and minimum numerical values and all the possible intermediate ranges, in addition to those specifically indicated below.

Step (A) of the method according to the present invention comprises providing a dispersion comprising an aqueous dispersing phase comprising palladium(II), at least one non-ionic surfactant and at least one compound bearing a beta-dithiocarbonyl group, so as to form a hydrophobic complex of the palladium(II) with the compound bearing a beta-dithiocarbonyl group.

Preferably, in step (A) of the method according to the present invention said dispersion comprises 1-100 ppm of palladium(II), more preferably it comprises 2-50 ppm of palladium(II), even more preferably 3-30 ppm of palladium (II).

Said concentration of palladium(II) in the aqueous dispersion prepared in step (A) resulted, in fact, optimal for conducting the method according to the present invention.

In addition to palladium(II), in the dispersion of step (A) of the method according to the present invention one or more other metals may be present in wastewater or in aqueous phases deriving from the extraction of metals from solid materials such as catalysts or electronic waste, such as cadmium, copper, silver, zinc, nickel, aluminium, lead, indium, gallium, iron, thallium, chromium, manganese and cobalt and mixtures thereof.

The method according to the present invention, in fact, although in the presence of these metals, is however capable of allowing a high-yield recovery of palladium.

Within the scope of the present invention, the content of palladium(II) and other metals in the dispersion of step (A) can be determined according to any of the methods known for this purpose to the person skilled in the art, for example by plasma atomic emission spectrophotometry (ICP-AES). For example, a known amount of dispersion can be suitably diluted with a $HNO_3$ 1% solution and analysed by ICP-AES with respect to a previously constructed calibration line and selecting the appropriate wavelength for each element to be investigated.

Preferably, in said step (A) said dispersion has a pH lower than 7, more preferably lower than or equal to 5, even more preferably lower than or equal to 3.

Said pH value can be the original one of the starting aqueous solution containing palladium(II) or it can be thus regulated by the addition of at least one acid or at least one base.

Preferably, step (A) of the method according to the present invention comprises adjusting the pH of the dispersion by adding at least one acid or at least one base.

Preferably, said acid is selected from the group consisting of nitric acid, hydrochloric acid or mixtures thereof.

Preferably, said base is selected from the group consisting of alkaline hydroxides or ammonia.

Preferably, in said step (A) the dispersion has a chloride concentration ranging between 0.3 and 1.5 moles/L.

The presence of chlorides, in fact, influences the selectivity of the method with respect to palladium and the value of the cloud point of the dispersion; chloride concentration values as stated above are optimal results for the method implementation.

Preferably, step (A) of the method according to the present invention comprises maintaining the temperature of said dispersion between 10 and 30° C., more preferably between 15 and 20° C.

In one embodiment, the dispersion of step (A) of the method according to the present invention is preferably prepared starting from an aqueous solution comprising palladium(II). Preferably, said aqueous solution comprising palladium(II) is wastewater, natural water, an aqueous solution deriving from at least one palladium dissolution treatment from at least one solid material, or mixtures thereof.

Preferably, said wastewater comes from an industrial process in which palladium is used.

Preferably said solid material is selected from the group consisting of a palladium-containing catalyst, more preferably an exhausted catalyst, electronic waste or mixtures thereof.

In one embodiment, step (A) of the process according to the present invention comprises treating a solid material comprising palladium with at least one acid or basic solution so as to bring said palladium(II) into solution.

Preferably, said acid solution comprises at least one acid selected from the group consisting of hydrochloric acid or nitric acid, or mixtures thereof.

In a preferred embodiment, said acid solution comprises a mixture comprising 1 to 5 parts by moles of nitric acid per 1 part by moles of hydrochloric acid, more preferably from 2 to 4 parts by moles of nitric acid for 1 part by moles of hydrochloric acid, even more preferably 3 parts by moles of nitric acid for 1 part by moles of hydrochloric acid.

Preferably, said acid solution has a concentration of $H^+$ ions between 0.1 and 2 equivalents/L, more preferably between 0.3 and 1.5 equivalents/L.

Preferably, said basic solution comprises at least one base selected from the group consisting of ammonia. Preferably, ammonia is used by treating the solid material in an oxidizing environment.

Preferably, said basic solution has a concentration of $OH^-$ ions between 0.1 and 5 equivalents/L, more preferably between 0.5 and 1 equivalent/L.

In a preferred embodiment, said treatment of a solid material comprising palladium with at least one acid solution comprises contacting said solid material with said acid solution at a temperature between 25 and 120° C. for a time ranging between 12 and 24 hours in the presence of inert gas. Preferably, said inert gas is selected from the group consisting of nitrogen or argon.

Preferably, said non-ionic surfactant is an ethoxylated surfactant, more preferably an optionally substituted ethoxylate alcohol, an optionally substituted alkyl-phenol ethoxylate, an optionally substituted fatty acid ethoxylate, an optionally substituted mono-alkanolamide ethoxylate, an optionally substituted sorbitan-ester ethoxylate, or an optionally substituted ethylene-propylene oxide copolymer.

Preferably, the non-ionic surfactant present in the dispersion of step (A) has a cloud point of between 25° C. and 45° C., measured in an aqueous solution at 1% by weight of said surfactant. The cloud point can be determined according to any of the methods known for this purpose to the person skilled in the art, for example, according to the method described in P. Samaddar, K. Sen Journal of Industrial and Engineering Chemistry 20 (2014) 1209-1219.

Surfactants with said cloud point resulted in fact particularly advantageous in that they allow the cloud point to be reached at temperatures slightly above room temperature, thereby requiring a minimum energy consumption.

Preferably, said non-ionic surfactant is an optionally substituted alkyl-phenol ethoxylate, more preferably selected from the group consisting of octyl- or nonyl-phenol ethoxylate.

More preferably, said optionally substituted alkyl-phenol ethoxylate is a poly(oxyethylene)octylphenyl-ether of formula (I)

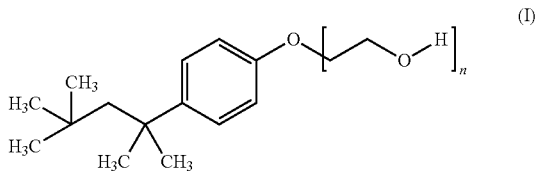

wherein n is an integer between 7 and 10.

Examples of non-ionic surfactants suitable for use in the method according to the present invention are registered trademark products by The Dow Chemical Company under the name TRITON® X-114 and X-100 and registered trademark products by Rhodia Operations under the name IGEPAL®.

Preferably, step (A) of the method according to the present invention comprises adding, with respect to the total volume of the dispersion, 0.1 to 1% by volume, more preferably 0.2 to 0.5% by volume of said non-ionic surfactant.

Non-ionic surfactant amounts within this range result in fact optimal for obtaining a dispersion which comprises a dispersed phase rich in surfactant comprising at least one part of the hydrophobic complex of palladium(II) with the compound bearing a beta-dithiocarbonyl group in the subsequent step (B) of the method according to the present invention.

Preferably, the compound bearing a beta-dithiocarbonyl group of step (A) of the method according to the present invention is an optionally substituted dithiomalonamide of formula (II)

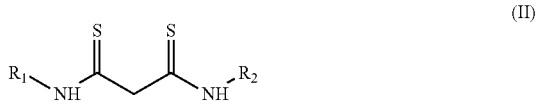

wherein $R_1$ and $R_2$ are two substituents independently selected from the group consisting of —H, optionally substituted alkyl or optionally substituted aryl.

More preferably, said optionally substituted dithiomalonamide is N,N'-diphenyldithiomalonamide.

Compounds of this type can be advantageously synthesized for example according to the method described in G. Barnikow, V. Kath, D. Richter, Isothiocyanate. II. N,N-Aryl-substituierte Dithiomalonsaurediamide. I, Journal fur Praktische Chemie 1965, 30, 63-66.

Preferably, in said step (A) the molar ratio of palladium (II):compound bearing a beta-dithiocarbonyl group is between 1:0.5 and 1:10, more preferably between 1:1 and 1:8, still more preferably between 1:1.5 and 1:5, even more preferably between 1:1.5 and 1:2.5.

Values of the ratio of palladium(II):compound bearing a beta-dithiocarbonyl group within these limits are in fact optimal results for obtaining the hydrophobic complex at high yield.

In a further preferred embodiment, in said step (A) the molar ratio of palladium(II):compound bearing a beta-dithiocarbonyl group is between 1:0.5 and 1:5, more preferably between 1:1.5 and 1:2.5.

Values of the ratio of palladium(II):compound bearing a beta-dithiocarbonyl group within these further limits are in fact optimal results also for obtaining a high selectivity in the recovery of the hydrophobic complex from the starting aqueous solution, despite the presence of other metals.

Preferably, the method according to the present invention comprises the step of keeping the dispersion resulting from step (A) under stirring for a time ranging between 1 and 30 minutes, more preferably between 10 and 20 minutes (called incubation step).

Step (B) of the method according to the present invention comprises heating the dispersion resulting from step (A) at a temperature at least equal to its cloud point so as to obtain phase the separation between the aqueous dispersing phase and a dispersed phase rich in surfactant comprising at least a part of said hydrophobic complex.

As a result of said heating, the non-ionic surfactant present in the dispersion in fact results in the phase separation between the dispersed phase rich in surfactant and the aqueous dispersing phase.

The hydrophobic complex of palladium(II) with the compound bearing a beta-dithiocarbonyl group is partitioned between the dispersed phase rich in surfactant and the remaining aqueous dispersing phase and consequently, the hydrophobic complex that is found in the dispersed phase rich in surfactant is concentrated in comparison with the initial aqueous dispersing phase.

Preferably, in step (B) of the method in accordance with the present invention, the dispersion resulting from step (A) is heated to a temperature between 0 and 40° C., higher than the cloud point of said dispersion.

Preferably, the method according to the present invention comprises the step of keeping the dispersion of step (B) in a thermostatic bath at said temperature for a time between 1 and 20 minutes, more preferably between 5 and 10 minutes. Preferably, the method according to the present invention comprises the step of cooling the dispersion of step (B).

In the method according to the present invention, step (C) comprises separating the dispersed phase rich in surfactant from the dispersion resulting from step (B).

In a preferred embodiment of the method according to the present invention, the step (C) of separating the dispersed phase rich in surfactant preferably comprises at least one liquid-liquid separation operation, more preferably at least one operation selected from the group consisting of centrifugation, decantation or any combination thereof.

Preferably, said centrifugation is carried out using a rotation speed of between 2,000 and 10,000 rpm.

Preferably, step (C) of the method according to the present invention is followed by a further step (C') which comprises re-feeding the dispersion of step (A), after it has been separated from the dispersed phase rich in surfactant, with the remaining part of the dispersion resulting from the performing of step (B) and performing again the operations of steps (A) to (C).

In this way, it is possible to increase the total yield of the method according to the invention.

In the method according to the present invention, step (D) comprises recovering the hydrophobic complex of palladium(II) with the compound bearing a beta-dithiocarbonyl group from the phase rich in surfactant resulting from step (C) by separation. Possibly, step (D) can be performed after a washing operation (C") of said phase rich in surfactant resulting from step (C).

Preferably, the washing step (C") of the method according to the present invention comprises at least one washing operation carried out with an aqueous medium of said phase rich in surfactant resulting from step (C).

Preferably, said washing operation is carried out using an acid aqueous solution. Preferably, said acid aqueous solution is an $HNO_3$ aqueous solution at 1% by weight or a HCl solution at 1% by weight.

Preferably, said washing operation (C") comprises the subsequent separation of the dispersed step (deriving from the addition of the acid aqueous solution) from that rich in surfactant by at least one operation of liquid-liquid separation, more preferably at least one operation selected from the group consisting of centrifugation, decantation or any combination thereof. Advantageously, the so-separated phase rich in surfactant can be treated according to step (D) and the dispersed phase can be treated according to steps (A) to (C).

Preferably, said centrifugation is carried out using a rotation speed between 2,000 rpm and 10,000 rpm.

Preferably, step (D) comprises separating the hydrophobic complex of palladium(II) with the compound bearing a beta-dithiocarbonyl group from the phase rich in surfactant resulting from step (C).

Preferably, step (D) of the method according to the present invention comprises forming a precipitate comprising said hydrophobic complex by adding at least one organic solvent to the phase rich in surfactant resulting from step (C).

Preferably, said organic solvent is selected from the group consisting of acetone, acetonitrile, ethyl ether, and mixtures thereof. More preferably, ethyl ether is used for precipitation.

In a particularly preferred embodiment, step (D) of the method according to the present invention comprises forming a precipitate comprising said hydrophobic complex by adding to the phase rich in surfactant resulting from step (C) at least one organic solvent selected from the group consisting of: acetone and acetonitrile, and subsequently adding ethyl ether to said organic solvent. Said addition of ethyl ether is preferably carried out by diffusion.

In a preferred embodiment of the method according to the invention, step (D) preferably comprises at least one purification operation of the hydrophobic complex of palladium (II) with the compound bearing a beta-dithiocarbonyl group selected from the group comprising filtration, washing, centrifugation, drying, or any combination thereof.

The hydrophobic complex of palladium(II) with the compound bearing a beta-dithiocarbonyl group obtained with the method according to the present invention can be subsequently used as such, for example as a catalyst, or it can undergo a reduction reaction to recover the palladium in metal form, according to any of the modes known to the person skilled in the art.

In its second aspect, the present invention relates to the use of a compound bearing a beta-dithiocarbonyl group as a palladium(II) complexing agent in a method for the recovery of palladium.

The advantages of this use have already been outlined regarding the method according to the first aspect of the present invention and are not repeated here.

Preferably, in said use, the compound bearing a beta-dithiocarbonyl group is an optionally substituted dithiomalonamide of formula (II)

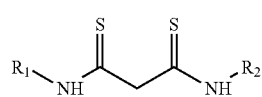

(II)

wherein $R_1$ and $R_2$ are two substituents independently selected from the group that consists of —H, optionally substituted alkyl or optionally substituted aryl.

More preferably, in said use, said optionally substituted dithiomalonamide is N,N'-diphenyldithiomalonamide.

Preferably, in said use the molar ratio of palladium(II): compound bearing a beta-dithiocarbonyl group is between 1:0.5 and 1:10, more preferably between 1:1 and 1:8, still more preferably between 1:1.5 and 1:5, even more preferably between 1:1.5 and 1:2.5.

In a further preferred embodiment, in said use the molar ratio of palladium(II):compound bearing a beta-dithiocarbonyl group is between 1:0.5 and 1:5, more preferably between 1:1.5 and 1:2.5.

The invention is now illustrated by means of some Examples to be construed for illustrative and not limitative purposes.

Example 1

A 1% by weight aqueous solution of nitric acid having a pH of 0.8-1 was prepared and it contained 5 ppm of palladium(II) and 10 ppm of each of the following metals: Cd, Cu, Ag, Zn, Ni, Al, Pb, In, Ga, Fe, Tl, Cr, Mn and Co.

A 10 mL aliquot of this solution was placed in a 15 mL polypropylene tube, to which 100 mg of a poly(oxyethylene) octylphenyl ether (TRITON® X-114, marketed by Sigma-Aldrich and registered trademark of The Dow Chemical Company) and N,N'-diphenyldithiomalonamide ("Hdpma", synthetic, as described in: M. Cuscusa, A. Rigoldi, F. Artizzu, R. Cammi, P. Fornasiero, P. Deplano, L. Marchiò, A. Serpe, ACS Sustainable Chem. Eng. 2017, 5, 4359-4370) in such quantity as to have a molar ratio of Pd:Hdpma of 1:2.

The obtained dispersion was then kept under stirring for 15 minutes in a Stuart SB tube rotator at 9 rpm speed, in a vertical position, at a temperature of 20° C.

Subsequently, the test tube containing the so-prepared dispersion was placed in a water bath and heated to 25° C., so as to obtain the phase separation and then a dispersion comprising a dispersed phase rich in surfactant comprising the hydrophobic complex of palladium(II)-Hdpma. The formation of the hydrophobic complex of palladium(II)-Hdpma was confirmed by spectroscopic analysis (IR, RAMAN) and X-ray diffraction (XRD) of the precipitate obtained by dissolving a sample of dispersed phase in acetone and subsequently making diethyl ether to diffuse into the solution containing the hydrophobic complex of palladium(II).

The dispersion then underwent centrifugation in an ALC 4222 centrifuge operating at 3,000-5,300 rpm and after cooling at 0° C. (in a water and ice bath) to separate the phase rich in surfactant comprising the hydrophobic complex of palladium(II)-Hdpma from the remaining dispersion.

The phase rich in surfactant obtained was then analysed to check the content of palladium and other co-extracted metals, diluting the solution with a $HNO_3$ aqueous solution at 1% by weight up to 10 mL and determining the quantity of metals by ICP-AES analysis by means of a Varian Lyberty200 spectrometer with a calibration line of the present elements realized using 3 to 5 standard solutions in the concentration range 0.1 to 10 ppm (correlation coefficient of the line>0.9999) in order to determine quantitatively the elements present in the extraction step.

Table 1 shows the results obtained, in which the percentage (%) of extraction was determined by applying the following formula:

extraction %=100×[molM$_t$/(molM$_t$+molM$_{aq}$)]

where:
concentration molM$_t$ represents the moles of the metal in the phase rich in surfactant; and
molM$_{aq}$ represents the moles of the metal in the remaining aqueous phase after separation.

The hydrophobic complex of palladium(II)-Hdpma was then recovered from the phase rich in surfactant by dissolving it in acetone and subsequently crystallized by slow diffusion of diethyl ether in the solution.

Examples 2, 3 and 4

Three further 10 mL aliquots of the initial solution prepared in Example 1 were placed in three 15 mL polypropylene tubes, to which 100 mg of TRITON® X-114 and Hdpma (prepared as described in Example 1) were added in such a quantity as to have a molar ratio Pd:Hdpma of 1:4, 1:6 and 1:8 respectively, on which the method according to Example 1 was then repeated.

Table 1 shows the results obtained.

TABLE 1

|  |  | Example 1 | Example 2 | Example 3 | Example 4 |
|---|---|---|---|---|---|
| Extraction % | Pd | 100 | 100 | 94.1 | 96.3 |
|  | Al | 11 | 11.2 | 11.5 | 13.8 |
|  | Cd | 2.0 | 4.4 | 12.9 | 1.0 |
|  | Co | 11.3 | 11.1 | 11.1 | 13.1 |
|  | Cr | 11.9 | 11.8 | 11.4 | 14.2 |
|  | Cu | 10.3 | 10.6 | 11 | 15.6 |
|  | Fe | 14.4 | 12 | 11.6 | 14.5 |
|  | Ga | 9.8 | 9.9 | 9.0 | 11.6 |
|  | In | 0.4 | 4.8 | 2.5 | 1.5 |
|  | Mn | 11.5 | 10.9 | 11.4 | 13.8 |
|  | Ni | 7.6 | 6.7 | 8.0 | 10.5 |
|  | Pb | 1.7 | 1.5 | 7.5 | 9.1 |
|  | Ag | 35.3 | 73 | 92.4 | 95 |
|  | Tl | 0.0 | 0.0 | 0.1 | 0.0 |
|  | Zn | 1.1 | 0.5 | 7.0 | 7.8 |

From the data in Table 1, it can be appreciated the quantitative or substantially quantitative extraction of palladium present in the starting solution in all four examples with a single operation. Moreover, it can be appreciated that, in the case of a ratio of palladium(II) to the compound bearing a beta-dithiocarbonyl group of 1:2 (Example 1), a quantitative and also selective recovery of palladium with respect to other metals present was obtained, as apparent from the comparison of the respective extraction percentages.

Example 5

About 100 mg of milled metallic material from electronic waste, obtained by grinding electronic cards and small equipment, and pre-depleted, by mechanical separation of ferrous metals, aluminium and plastic-glass materials, and having the composition (% by weight): Cu 79%, Sn 10%, Pb 7%, Zn 2%, Ni 0.5%, Ag 0.06%, Au 0.01%, others (Al, Cr, Mn, Fe, Co) 1%, were treated with 50 mL of an aqueous HCl solution (7% by weight) for 8 h at room temperature and under Ar flow as described in Serpe, A., Artizzu, F., Espa, D., Rigoldi, A., Mercuri, M. L., Deplano, P. "From trash to resource: A green approach to noble-metals dissolution and recovery" (2014) Green Processing and Synthesis, 3 (2), pages 141-146.

The obtained solution, poor in Pd due to the type of electronic material selected, was added with a suitable quantity of 1,000 ppm of a Pd(II) solution which simulated the typical concentration of such metal in specific electronic components such as capacitors, and diluted at 100 mL with $HNO_3$ 1% by weight so as to finally have a chloride concentration of 0.1 moles/L. The composition of the solution was then determined by ICP-AES analysis using a Lyberty 200 Varian spectrometer with a calibration line of the present elements, realized using 5 standard solutions in the concentration range of 0.1 to 10 ppm for all elements, except for copper for which the line was extended to 50 ppm (correlation coefficient of lines>0.9999) and is shown in Table 2.

TABLE 2

|  | Ag | Al | Cr | Cu | Fe | Ni | Pb |
|---|---|---|---|---|---|---|---|
| ppm | 0.1 | 0.7 | 0.2 | 127.8 | 2.2 | 0.1 | 21.7 |
|  | Pd | Zn | Sn | Au | Mn | Co |  |
| ppm | 4.5 | 16.0 | ND* | <LD** | <LD** | <LD** |  |

*ND = signal not detectable;
<LD = signal below the measurement detection limit;

The method according to Example 1 was then repeated on a 10 ml aliquot of the solution thus obtained, adding the compound bearing a beta-dithiocarbonyl group Hdpma in an amount such as to have a molar ratio of palladium(II): Hdpma of 1:2.

The extraction percentages of metals in the phase rich in surfactant obtained, determined by ICP-AES under the same conditions above described, are summarized in Table 3.

TABLE 3

|  | Ag | Al | Cr | Cu | Fe | Ni | Pb |
|---|---|---|---|---|---|---|---|
| % of extraction | — | 9.3 | — | 2.4 | 13.7 | — | 1.8 |
|  | Pd | Zn | Sn | Au | Mn | Co |  |
| % of extraction | 94.4 | — | — | — | — | — |  |

From the data in Table 3, it is possible to appreciate that some metals present in high quantities in the initial aqueous phase have been partially co-extracted in low percentage in the phase rich in surfactant.

To improve the selectivity of the recovery method and reduce the quantity of co-extracted metals, the method described hereabove in the present Example was repeated on two further 10 mL aliquots of the starting aqueous solution and two different washing operations were carried out on the respective phases rich in surfactant obtained.

For the first washing operation ("washing with HCl") the first of the two further phases rich in surfactant obtained, containing the metals referred to in Table 3, underwent a washing operation by adding 10 mL of an Aqueous HCl solution 0.3 M and subsequent separation of the phases according to the procedure described in Example 1.

In the same way, the second of the further two phases rich in surfactant obtained, containing the metals referred to in Table 3, underwent a washing operation ("washing with $HNO_3$") by adding 10 mL of a aqueous $HNO_3$ solution 0.3 M and subsequent separation of the phases according to the procedure described in Example 1.

Both washing operations allowed the complete reduction of the concentration of other metals (concentration below the measurement detection limit) without reducing the extraction percentage of palladium, obtaining in both cases, already after a single washing operation, an extraction percentage of palladium equal to more than 94%, as shown in Table 4.

TABLE 4

| | Extraction % | | | | | | | | |
|---|---|---|---|---|---|---|---|---|---|
| | Ag | Al | Cr | Cu | Fe | Ni | Pb | Pd | Zn |
| Washing with HCl | — (—) | — (—) | — (—) | — (—) | — (—) | — (—) | — (—) | 94.0 (89) | — (—) |
| Washing with $HNO_3$ | — (—) | — (—) | — (—) | — (—) | — (—) | — (—) | — (—) | 97.2 (92) | — (—) |

In Table 4, the first value shown for each metal is the extraction percentage value obtained in the washing operation on the phase rich in surfactant and determined by applying the formula shown in Example 1 to the washing operation only: in this case, $molM_t$ corresponds to the moles of the metal in the phase rich in surfactant obtained following the washing operation and $molM_{aq}$ corresponds to the moles of metal in the aqueous phase separated from the phase rich in surfactant after the washing operation. On the other hand, the second value in brackets is the value of the total extraction percentage of the method according to the present invention beginning from the starting aqueous solution: in this case, $molM_t$ corresponds to the moles of metal in the phase rich in surfactant obtained at the end of the washing operation and $M_{aq}$ corresponds to the moles of metal in the aqueous phase separated from the phase rich in surfactant before the washing operation.

Also, in Table 4, the symbol "-" indicates a value that cannot be determined because the concentration of metal in the phase rich in surfactant is below the detection limit of the measurement method used.

From the obtained data the quantitative or substantially quantitative extraction of the palladium present in the starting, and furthermore the improvement of the selectivity of the method obtainable by using at least one washing operation of the phase rich in surfactant solution, may be appreciated.

The invention claimed is:

1. A method for the recovery of palladium, comprising the steps of:
   (A) providing a dispersion comprising:
      an aqueous dispersing phase comprising palladium(II),
      at least one non-ionic surfactant and
      at least one compound bearing a beta-dithiocarbonyl group,
      so as to form a hydrophobic complex of palladium(II) with the compound bearing a beta-dithiocarbonyl group;
   (B) heating the dispersion resulting from step (A) to a temperature at least equal to its cloud point so as to obtain: a phase separation between the aqueous dispersing phase; and, a dispersed phase comprising a surfactant and at least a part of said hydrophobic complex;
   (C) separating the dispersed phase from the aqueous dispersing phase resulting from step (B); and
   (D) recovering the hydrophobic complex of palladium(II) with the compound bearing a beta-dithiocarbonyl group.

2. The method according to claim 1, wherein in said step (A) said dispersion comprises between about 1-100 ppm of palladium(II).

3. The method according to claim 1, wherein in said step (A) said dispersion has a pH lower than 7.

4. The method of claim 1, wherein in said step (A) the pH is adjusted by adding at least one acid or at least one base.

5. The method according to claim 4, wherein said at least one acid is selected from the group consisting of nitric acid, hydrochloric acid and mixtures thereof, and said at least one base is selected from the group consisting of an alkaline hydroxide and ammonia.

6. The method of claim 1, wherein in said step (A) the dispersion has a concentration of chlorides between about 0.3 and 1.5 moles/L.

7. The method of claim 1, wherein said non-ionic surfactant comprises an ethoxylate surfactant.

8. The method according to claim 5, wherein said non-ionic surfactant comprises:
   a substituted ethoxylate alcohol, a substituted alkyl-phenol ethoxylate,
   a substituted fatty acid ethoxylate,
   a substituted monoalkanolamide ethoxylate,
   a substituted sorbitan ester ethoxylate,
   a substituted ethylene oxide-propylene oxide copolymer; or
   a combination thereof.

9. The method of claim 1, wherein said step (A) comprises adding 0.1 to 1% by volume, with respect to the total volume of the dispersion, of said non ionic surfactant.

10. The method of claim 1, wherein said compound bearing a beta-dithiocarbonyl group is a substituted dithiomalonamide of formula (II)

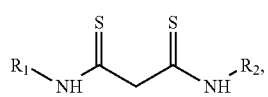

wherein R1 and R2 are two substituents independently selected from the group consisting of —H, a substituted alkyl and a substituted aryl.

11. The method according to claim 8, wherein the substituted dithiomalonamide comprises N,N'-diphenyldithiomalonamide.

12. The method of claim 1, wherein in said step (A) the molar ratio of palladium(II):compound bearing a beta-dithiocarbonyl group is between about 1:0.5 and 1:10.

13. The method according to claim 10, wherein in said step (A) the molar ratio of palladium(II):compound bearing a beta-dithiocarbonyl group is between about 1:0.5 and 1:5.

14. The method of claim 1, wherein in said step (B) the dispersion resulting from step (A) is heated to a temperature of between about 0° C. to 40° C., greater than the cloud point of said dispersion.

15. The method of claim 1, wherein said step (C) comprises re-feeding at step (A) the remaining part of the dispersion resulting from step (B) after it has been separated from the dispersed phase.

16. The method of claim 1, wherein said step (D) comprises separating the hydrophobic complex of palladium(II) with the compound bearing a beta-dithiocarbonyl group from the dispersed phase comprising a surfactant resulting from step (C).

17. The method of claim 1, wherein said step (C) is followed by a further step (C') which comprises re-feeding the dispersion of step (A), after it has been separated from the dispersed phase comprising a surfactant, with the remaining part of the dispersion resulting from performing the step (B), and performing again the operations of steps (A) to (C).

18. The method of claim 1, wherein said step (C) is followed by a further step (C") which is a washing of said dispersed phase comprising a surfactant resulting from step (C) performed with an aqueous medium consisting of an acid aqueous solution.

19. The method of claim 1, wherein said step (D) comprises adding at least one organic solvent to the dispersed phase comprising a surfactant resulting from step (C) to form a precipitate comprising said hydrophobic complex.

20. The method claim of claim 19, wherein said organic solvent is selected from the group consisting of acetone, acetonitrile, ethyl ether, and mixtures thereof.

* * * * *

UNITED STATES PATENT AND TRADEMARK OFFICE
CERTIFICATE OF CORRECTION

| | | |
|---|---|---|
| PATENT NO. | : 12,012,643 B2 | Page 1 of 1 |
| APPLICATION NO. | : 17/281740 | |
| DATED | : June 18, 2024 | |
| INVENTOR(S) | : Angela Serpe et al. | |

It is certified that error appears in the above-identified patent and that said Letters Patent is hereby corrected as shown below:

On the Title Page

Item (73) should read:
(73) Assignee: UNIVERSITA' DEGLI STUDI DI CAGLIARI, Cagliari (IT)

Signed and Sealed this
Seventeenth Day of December, 2024

Derrick Brent
*Acting Director of the United States Patent and Trademark Office*